United States Patent [19]
Norris et al.

[11] Patent Number: 5,867,222
[45] Date of Patent: *Feb. 2, 1999

[54] VIDEO SYNC SIGNAL SLICING USING VARIABLE GAIN CONTROL

[75] Inventors: Robert L. Norris, Milpitas; Bruce D. Rosenthal, Los Gatos, both of Calif.

[73] Assignee: Elantec Semiconductor, Inc., Milpitas, Calif.

[*] Notice: This patent issued on a continued prosecution application filed under 37 CFR 1.53(d), and is subject to the twenty year patent term provisions of 35 U.S.C. 154(a)(2).

[21] Appl. No.: 803,777

[22] Filed: Feb. 24, 1997

Related U.S. Application Data

[63] Continuation of Ser. No. 584,803, Jan. 11, 1996, abandoned.
[51] Int. Cl.⁶ ........................................... H04N 5/08
[52] U.S. Cl. ................................. 348/528; 348/532
[58] Field of Search ........................... 348/528, 532, 348/525, 529, 530, 533, 534, 500, 505, 506, 465, 678; 375/317, 318, 319, 345; 327/77, 87, 538; 358/153; H04N 5/08, 5/10, 5/52, 5/153

[56] References Cited

U.S. PATENT DOCUMENTS

| | | | |
|---|---|---|---|
| 3,699,256 | 10/1972 | Roth | 348/528 |
| 4,064,541 | 12/1977 | Schneider et al. | 348/532 |
| 4,357,629 | 11/1982 | McGinn | 348/532 |
| 4,385,319 | 5/1983 | Hasegawa | 348/532 |
| 4,580,166 | 4/1986 | Okano | 348/531 |
| 4,677,388 | 6/1987 | Morrison | 327/78 |
| 4,707,730 | 11/1987 | Alard | 348/525 |
| 4,723,165 | 2/1988 | Bart | 348/532 |
| 4,860,100 | 8/1989 | Rakhodai et al. | 348/532 |
| 4,918,525 | 4/1990 | Vladkov | 348/532 |

*Primary Examiner*—Chris Grant
*Attorney, Agent, or Firm*—Fliesler, Dubb, Meyer & Lovejoy

[57] ABSTRACT

A video sync slicing circuit is disclosed that employs an adjustable gain control (AGC) amplifier and circuitry that adjusts a gain of the AGC amplifier such that a blanking level of the video signal at an output of the AGC amplifier equals a blanking reference voltage. The slicing circuit includes a circuit that triggers a composite sync signal when a sync pulse of the video signal equals the fifty percent slicing level.

8 Claims, 4 Drawing Sheets

VIDEO SYNC SIGNAL SLICING USING VARIABLE GAIN CONTROL

This application is a Continuation of Ser. No. 08/584,803, filed Jan. 11, 1996, now abandoned.

BACKGROUND OF THE INVENTION

1. Field of the Invention

The present invention pertains to the field of video circuits. More particularly, this invention relates to an integrated circuit that employs adjustable gain control to perform video sync signal slicing.

2. Art Background

Video systems such as television receivers, video recorders, and computer display monitors commonly conform to one or more of a variety of video signal standards. One such video signal standard is the National Television Systems Committee (NTSC) standard which prevails in North America. Another such standard in the Phase Alternation Line-rate (PAL) standard which is common in Europe.

Both the NTSC and PAL standards define a series of sync pulses or a sync pulse train embedded within a video signal. Such a sync signal is typically provided to synchronize various portions of information contained in the video signal. For example, both the NTSC and PAL standards specify the 50% signal amplitude levels that occur on the leading edge of the horizontal sync pulse as a timing reference for color burst information contained in the video signal.

The video signals processed by video systems typically vary in amplitude due to of a variety causes. For example, atmospheric influences during video signal transmission typically cause variation in video signal amplitude. In addition, amplifier and cable attenuation and cable termination variation in cable transmission systems commonly cause amplitude variation in video signals. Theoretically, the 50% signal amplitude level of a horizontal sync pulse provides a suitable timing reference point in view of such amplitude variation.

As a consequence, prior video systems usually contain circuitry that detects such 50% signal amplitude levels on the horizontal sync pulse. Such a detection of the 50% signal amplitude levels of the horizontal sync pulse is commonly referred to as 50% video sync signal slicing.

One prior circuit for performing 50% video sync signal slicing employs sample and hold capacitors that store a sampled amplitude range of the horizontal sync pulse. However, such a circuit typically requires constant refresh by the horizontal sync pulses of the input video signal. If the input video signal is removed, the sample and hold capacitors typically discharge which may cause erroneous detections of the 50% slicing level. As a consequence, such a prior circuit includes a set of gates that isolate the sample and hold capacitors once the video input signal is removed. Unfortunately, such extra gates increases the cost of such circuitry. In addition, such extra gates consume the integrated circuit die space and thereby increase the overall cost of video systems that implement video sync signal slicing circuitry on an integrated circuit chip.

SUMMARY AND OBJECTS OF THE INVENTION

One object of the present invention is to provide fifty percent sync signal slicing.

Another object of the present invention is to prevent false detections of the sync signal slicing level after removal of the video signal.

A further object of the present invention is to minimize integrated circuit die area required to implement a fifty percent sync slicing circuit.

These and other objects are provided by a slicing circuit that includes an adjustable gain control (AGC) amplifier that amplifies a video signal having a sync tip clamped to a clamp reference voltage and further including circuitry that adjusts a gain of the AGC amplifier such that a blanking level of the video signal at an output of the AGC amplifier equals a blanking reference voltage. The slicing circuit also includes a circuit that triggers a composite sync signal when a horizontal sync pulse of the amplified video signal equals fifty percent of a difference between the blanking and clamp reference voltages.

Other objects, features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
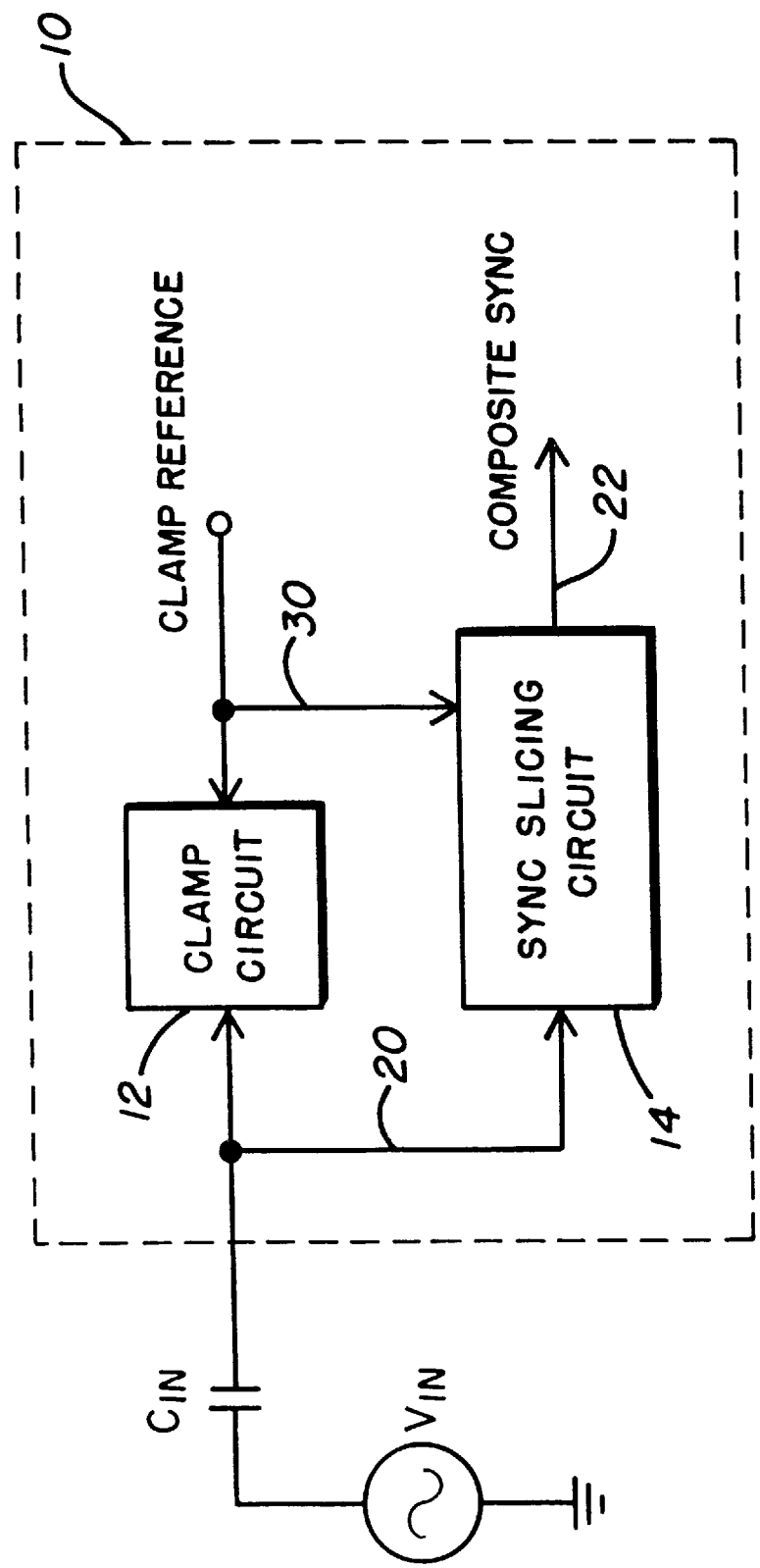
FIG. 1 illustrates the relevant circuitry of a video sync separator integrated circuit chip.

FIG. 1 illustrates relevant portions of a video sync separator circuit 10. In one embodiment, the video sync separator circuit 10 is implemented on an integrated circuit chip. The video sync separator circuit 10 is AC coupled to a video input source ($V_{IN}$) through a capacitor ($C_{IN}$). The video sync separator circuit 10 includes a clamp circuit 12 and a sync slicing circuit 14.

The clamp circuit 12 uses a clamp reference voltage 30 to introduce a DC offset into $V_{in}$ and provide a video input signal at a node 20. The clamp circuit 12 clamps a sync tip portion of the horizontal sync pulse of the video input signal at the node 20 to the fixed clamp reference voltage available on the node 30.

The sync slicing circuit 14 receives the video input signal 20, having the clamped sync tip and performs 50% slicing of the horizontal sync pulse carried by the video input signal 20. The slicing circuit 14 generates a composite sync signal 22 that results from sync signal slicing.

Figure 2:
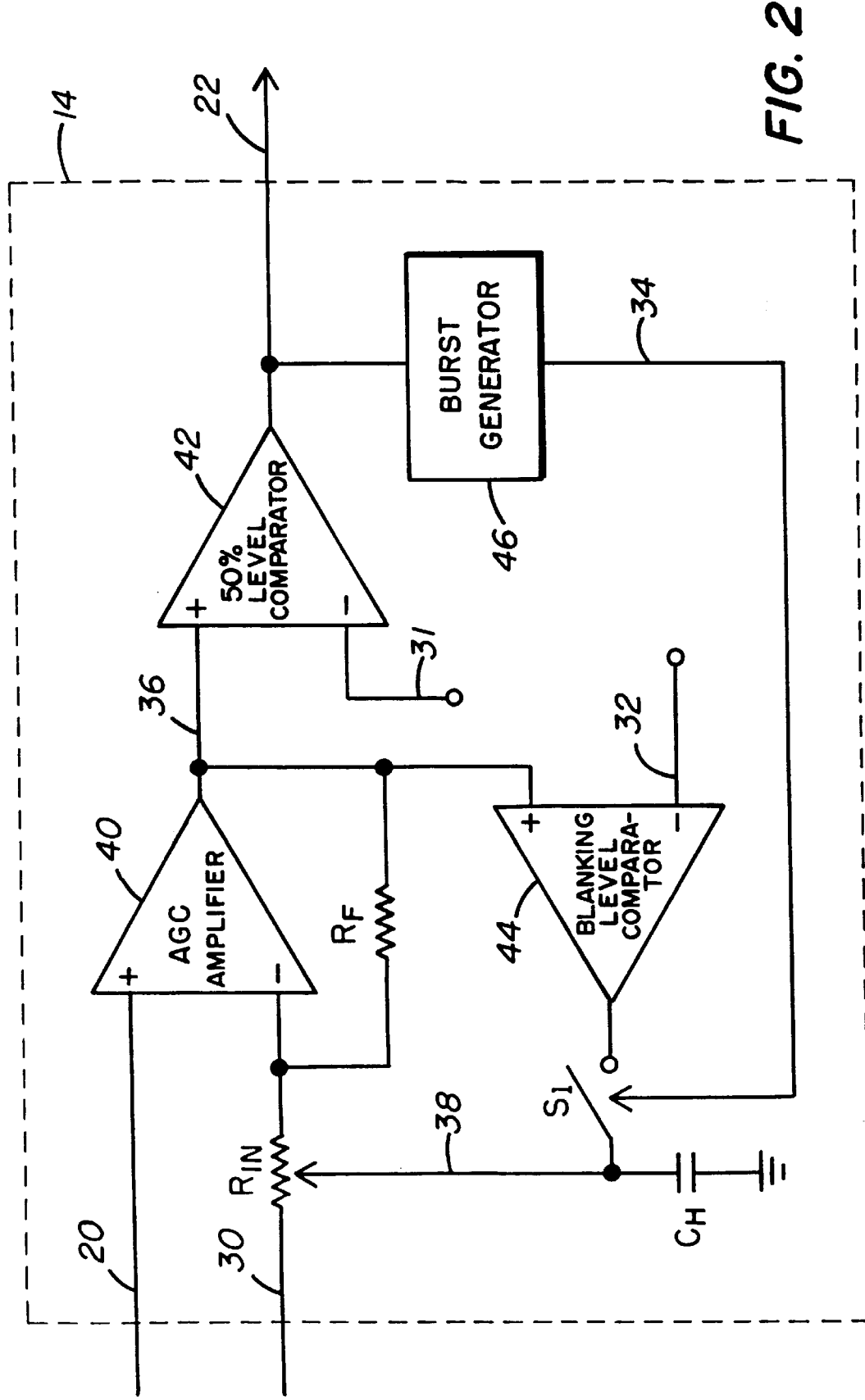
FIG. 2 illustrates the video sync slicing circuitry which includes an adjustable gain control amplifier, a pair of comparators; and a burst generator circuit.

FIG. 2 illustrates the sync slicing circuit 14 in one embodiment. The sync slicing circuit 14 includes a set of amplifiers 40, 42, 44 along with a burst generator 46.

The amplifier 40 is configured as an adjustable gain control (AGC) amplifier using a feedback resistor $R_F$ along with an adjustable input resistor $R_{IN}$. The gain of the amplifier 40 is controlled by the value of $R_{IN}$. $R_{IN}$ and $R_F$ are really PMOS transistors which behave like resistors because they are biased in the linear region. The value of $R_{IN}$ is determined by a control voltage held by a capacitor $C_H$ at a node 38. The lower the voltage on the node 38, the lower the impedance of $R_{IN}$ and the higher the gain of the amplifier 40. The amplifier 40 generates an amplified video input signal at an AGC output 36.

The amplifier 42 is configured as a comparator 42 that compares the AGC output 36 of the amplifier 40 to a constant 50% slicing reference 31. The comparator 42 triggers the composite sync signal 22 when the horizontal sync pulse at the AGC output 36 crosses the 50% slicing reference 31.

The burst generator 46 detects the occurrences of rising edges of the composite sync signal at the output 22 of the comparator 42 and generates a pulse of a burst signal 34 that indicates the color burst intervals. The burst generator 46 contains a timing circuit that is triggered by the composite sync signal 22. The timing circuit determines the timing of the rising and falling edges the burst signal 34. In one embodiment, the timing intervals of the burst generator timing circuit are externally controllable via input pins (not shown) of the video sync separator circuit 10.

The amplifier 44 is configured as a comparator 44. The output of the comparator 44 indicates relative voltage differential between the AGC output 36 and a constant blanking reference 32. The output of the amplifier 44 sets the voltage on the capacitor $C_H$ and controls the gain of the amplifier 40 during the color burst intervals.

The burst signal 34 controls a solid state switch S1 at the output of the comparator 44. The solid state switch S1 selectively couples the output of the comparator 44 to charge the holding capacitor $C_H$. The burst signal 34 closes the switch S1 during color bursts on the video input signal $V_{IN}$ and opens the switch S1 at other intervals of $V_{IN}$.

The gain control voltage on the capacitor $C_H$ available at the node 38 controls the impedance of the variable resistor $R_{IN}$ and therefore the gain of the amplifier 40. During the color burst interval indicated by the burst signal 34, the switch S1 is closed and the output of the comparator 44 charges the node 38 which adjusts the gain of the amplifier 40 until the average voltage level of the color burst at the AGC output 36 equals the blanking reference voltage 32.

The switch S1 opens after the burst signal 34 times out. During the remainder of the video input signal at the AGC output 36, the capacitor $C_H$ holds the gain control voltage on the node 38 and thereby holds the gain of the amplifier 40 to the gain set during the previous color burst interval. The comparator 42 detects the point at which a transition of the horizontal sync pulse on the AGC output 36 crosses the 50% sync reference 31. Once the AGC output 36 crosses the 50% sync reference 31, the composite sync signal 22 is triggered which in turn triggers the next pulse of the burst signal 34.

The circuit loop that includes the comparators 42 and 44 ensures that the blanking level of the AGC output 36 equals the blanking reference voltage 32 during the color burst interval of the video input signal at the AGC output 36. In addition, the clamp reference voltage 30 provides a voltage around which the amplifier 40 amplifies the video input signal on the node 20. As a consequence, the voltage differential between the blanking level during color burst and the sync tip voltage level has a constant amplitude at the AGC output 36. The 50% sync reference 31 is preselected equal to ½ of the constant amplitude between blanking and sync tip of the AGC output 36.

If the video input signal $V_{IN}$ is removed, then the holding capacitor $C_H$ discharges and lowers the voltage on the node 38 which thereby causes an increase in gain of the amplifier 40. At the same time, a discharge current in the clamp circuit 12 causes the voltage input signal 20 to assume the value of the clamp reference 30 which is a voltage lower than the sync reference 31. The clamp circuit 12 maintains this level of the voltage input signal 20 which prevents false triggering in the comparator 42 after the video input signal $V_{IN}$ is removed.

Figure 3:
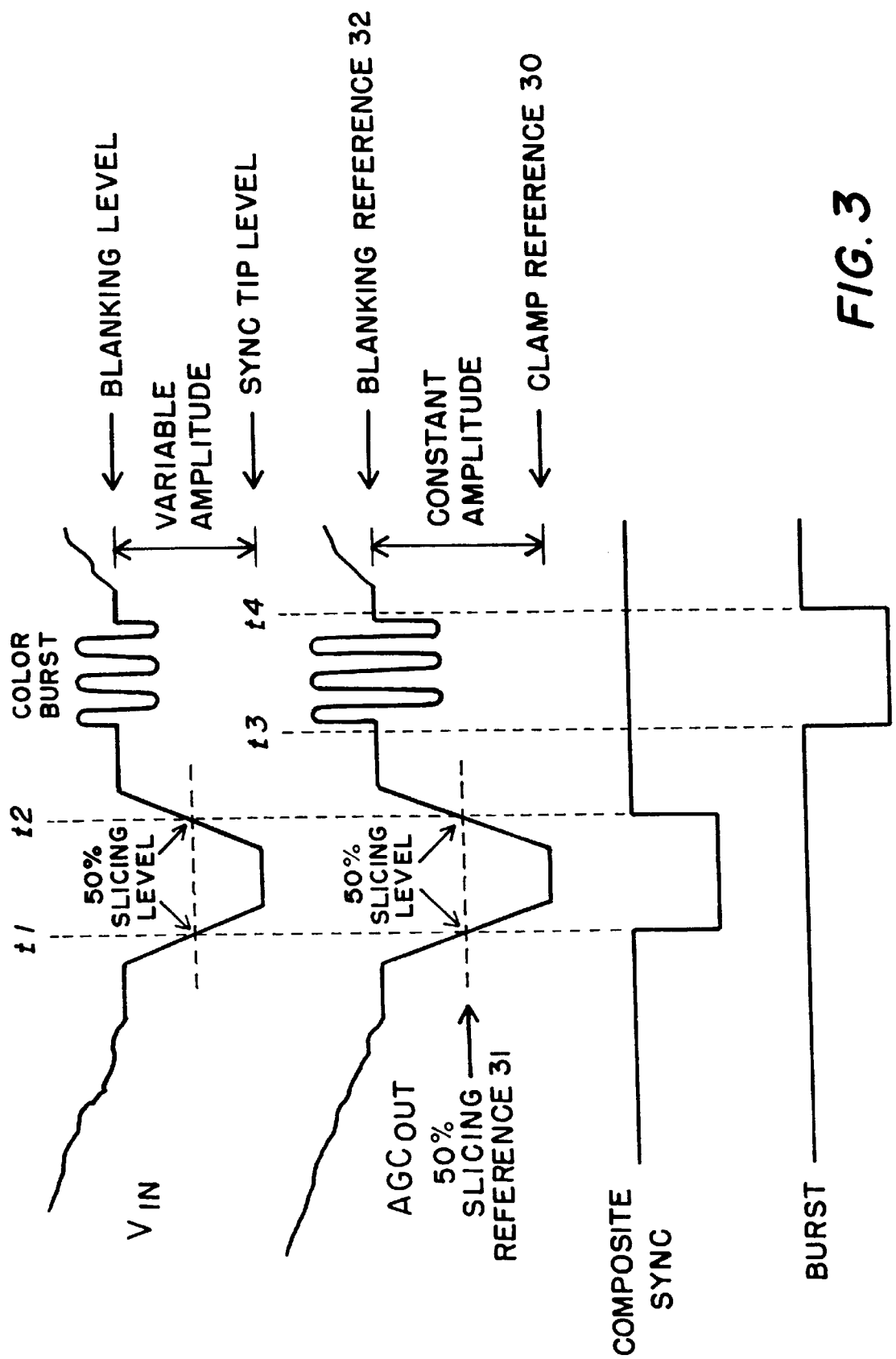
FIG. 3 illustrates the video input signal $V_{IN}$ along with the AGC output, the composite sync signal, and the burst signal.

FIG. 3 illustrates the video input signal $V_{IN}$ along with the AGC output 36, the composite sync signal 22, and the burst signal 34. The amplitude of the video input signal $V_{IN}$ is variable. As a consequence, the times at which the horizontal sync pulse of $V_{IN}$ crosses all levels except the 50% slicing level at time t1 and at time t2 shift as the amplitude of $V_{IN}$ varies. However, the times at which the horizontal sync pulse of $V_{IN}$ cross the 50% slicing level at time t1 and at time t2 do not shift as the amplitude of $V_{IN}$ varies.

In contrast, the AGC output 36 (AGC OUT) has a constant amplitude between the blanking reference 32 and the clamp reference 30. The 50% slicing reference 31 is constant and equal to ½ of the voltage differential between the blanking reference 32 and the clamp reference 30. The falling and rising edges of the horizontal sync pulse at the AGC output 36 cross the 50% slicing reference 31 at times t1 and t2 and trigger a pulse of the composite sync signal 22.

The rising edge of the composite sync signal 22 at time t2 triggers a timing circuit in the burst generator 46 that provides a burst pulse between times t3 and t4. The burst pulse occurs during the color burst interval of the video signal on the AGC output 36. The pulse on the burst signal 34 closes the switch S1 during color burst. The average voltage on the AGC output 36 during the color burst is held at the blanking reference 32 by the output voltage of the comparator 44. This comparator 44 output voltage that sets the blanking level to the blanking reference 32 during color burst is held by the capacitor $C_H$ and controls the gain of the amplifier 40 to provide constant blanking amplitude during slicing of the subsequent horizontal sync pulse.

Figure 4:
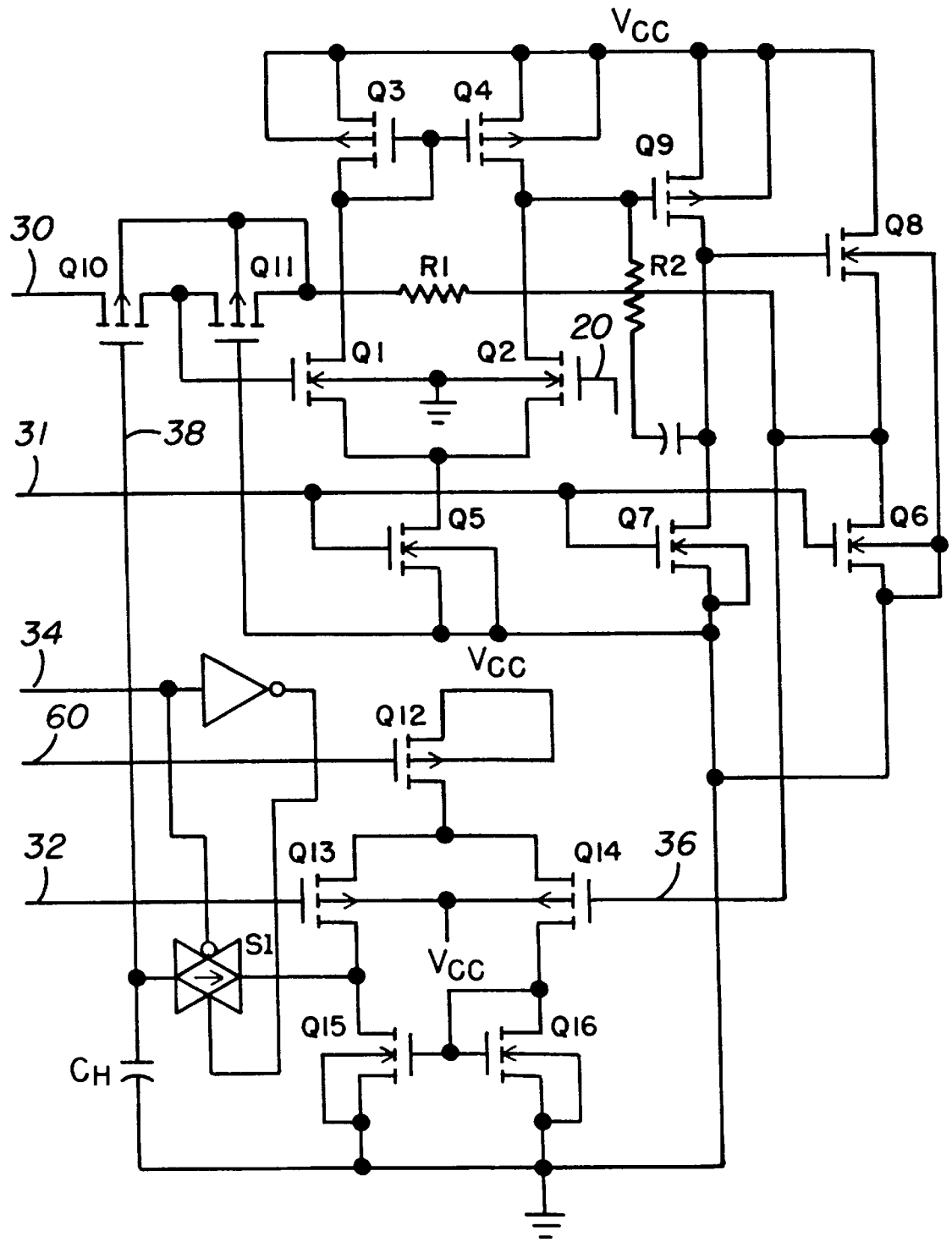
FIG. 4 is a schematic diagram of one embodiment of the sync slicing circuitry.

FIG. 4 illustrates one embodiment of the sync slicing circuit 14 excluding the burst generator 46 and the comparator 42. The amplifier 40 includes a set of transistors Q1–Q9. A transistor Q11 along with a resistor R1 are configured as the feedback resistor $R_F$ and a transistor Q10 is configured as the variable input resistor $R_{IN}$. The control voltage at the node 38 is applied to the gate of the transistor Q10 to control conductance through the transistor Q10. The comparator 44 includes a set of transistors Q12–Q16.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A circuit comprising:
   an adjustable gain control (AGC) amplifier that has a signal input for receiving a video signal having a sync pulse, and a gain control input for receiving a gain control signal, the AGC amplifier having an output providing the video signal which is amplified as controlled by the gain control signal;
   a 50% level comparator having a first input coupled to the output of the AGC amplifier and a second input receiving a 50% slicing reference voltage, the 50% level comparator having an output providing a composite sync signal indicating when the sync pulse from the output of the AGC amplifier crosses the 50% slicing reference voltage;
   a blanking level comparator having a first input receiving a blanking reference voltage, a second input coupled to the output of the AGC amplifier, and having an output;

a switch coupling the output of the blanking level comparator to the gain control input of the AGC amplifier, the switch having a control input coupled to the output of the 50% level comparator; and a capacitor coupled to the gain control input of the AGC amplifier.

2. The circuit of claim 1 further comprising:

a burst generator coupled between the output of the 50% level comparator and the control input of the switch, the burst generator generating a burst signal during a color burst interval of the video signal.

3. The circuit of claim 2, wherein the burst signal is timed to an edge of the composite sync signal.

4. The circuit of claim 2, wherein the switch is controlled by the burst signal such that the gain control signal has a voltage adjusted during the color burst interval and held by the capacitor during a remainder of the video signal.

5. The circuit of claim 1, wherein the AGC amplifier further has a reference input for receiving a clamp reference voltage, the AGC amplifier providing an output with the sync pulse having a sync tip clamped to the clamp reference voltage.

6. A method for video sync signal slicing, comprising the steps of:

amplifying a video signal the video signal, having a sync pulse with a sync tip at a clamp reference voltage, the video signal being amplified as controlled by a gain control voltage such that a blanking level of the video signal substantially equals a blanking reference voltage;

triggering a composite sync signal when a sync pulse of the video signal is approximately fifty percent of a difference between the blanking and clamp reference voltages;

generating a burst signal pulse as triggered by the composite sync signal; and generating the gain control voltage by amplifying a difference between the blanking level of the video signal and the blanking reference voltage during the burst signal pulse.

7. The method of claim 6, wherein the gain control voltage is held near a voltage level provided during the burst signal pulse during a horizontal sync pulse and a video interval of the video signal.

8. The method of claim 6, wherein the burst signal pulse has a pulse width corresponding to a color burst interval of the video signal.

* * * * *